United States Patent [19]

Stephan et al.

[11] Patent Number: 5,390,335

[45] Date of Patent: Feb. 14, 1995

[54] METHOD FOR MODIFYING SYSTEM CONFIGURATION DATA SETS IN A TELECOMMUNICATIONS SWITCHING SYSTEM

[75] Inventors: Luzia Stephan, Bergkirchen-Feldgeding; Juergen Hoefner, Mammendorf; Friedrich Woess, Otterfing, all of Germany

[73] Assignee: Siemens Aktiengesellschaft, Munich, Germany

[21] Appl. No.: 915,619

[22] Filed: Jul. 21, 1992

[30] Foreign Application Priority Data

Jul. 31, 1991 [DE] Germany ..................... 4125389

[51] Int. Cl.⁶ ........................................... H04Q 11/04
[52] U.S. Cl. ................................. 395/800; 370/58.2; 364/282.1; 364/230.4; 364/222.2; 364/222.82; 364/962.1; 364/974; 364/974.3; 395/600
[58] Field of Search ................. 364/DIG. 1, DIG. 2; 370/58.1, 58.2, 58.3; 395/800, 600

[56] References Cited

U.S. PATENT DOCUMENTS

| | | | |
|---|---|---|---|
| 4,903,258 | 2/1990 | Kuhlmann et al. | 370/58.2 |
| 4,993,017 | 2/1991 | Bachinger et al. | 370/58.2 |
| 5,018,097 | 5/1991 | Kuhlmann et al. | 364/900 |
| 5,047,923 | 9/1991 | Elstner et al. | 364/200 |

FOREIGN PATENT DOCUMENTS

0237841 9/1987 United Kingdom .

OTHER PUBLICATIONS

"Hardware Structure of the HICOM Communication Computer" by G. Beckinger et al; Telcom, 1985, pp. 56–64.

"Operating Software of the HICOM ISDN Communication System" by H. Thomas et al, Telcom, Dec. 1985, pp. 92–103.

"Lehrbuch der Fernmeldetechnik" by Bergmann, vol. 2, Berlin 1986, pp. 1571–1574.

*Primary Examiner*—Alyssa H. Bowler
*Assistant Examiner*—Walter D. Davis, Jr.
*Attorney, Agent, or Firm*—Hill, Steadman & Simpson

[57] ABSTRACT

A method for modifying system configuration data sets in a telecommunications switching system that has first function modules (SWU-ADS) for processing switching-oriented and/or administration and maintenance procedures and second peripheral function modules (VMS, ETB) for realizing supplementary performance features. For producing data consistency, backup copies are produced of the content of at least a part of the databases and administration and maintenance commands that modify database contents and that are subsequently input into the system, are listed in the form of command information in the chronological sequence of their occurrence. Every command information is supplemented with a database-associated information that indicates the implementation or non-implementation of the respective administration and maintenance command. The method enables data consistency both in those cases wherein peripheral function modules are temporarily disconnected from the system as well as in those cases wherein new peripheral function modules are to be later connected to the system for a first time.

10 Claims, 12 Drawing Sheets

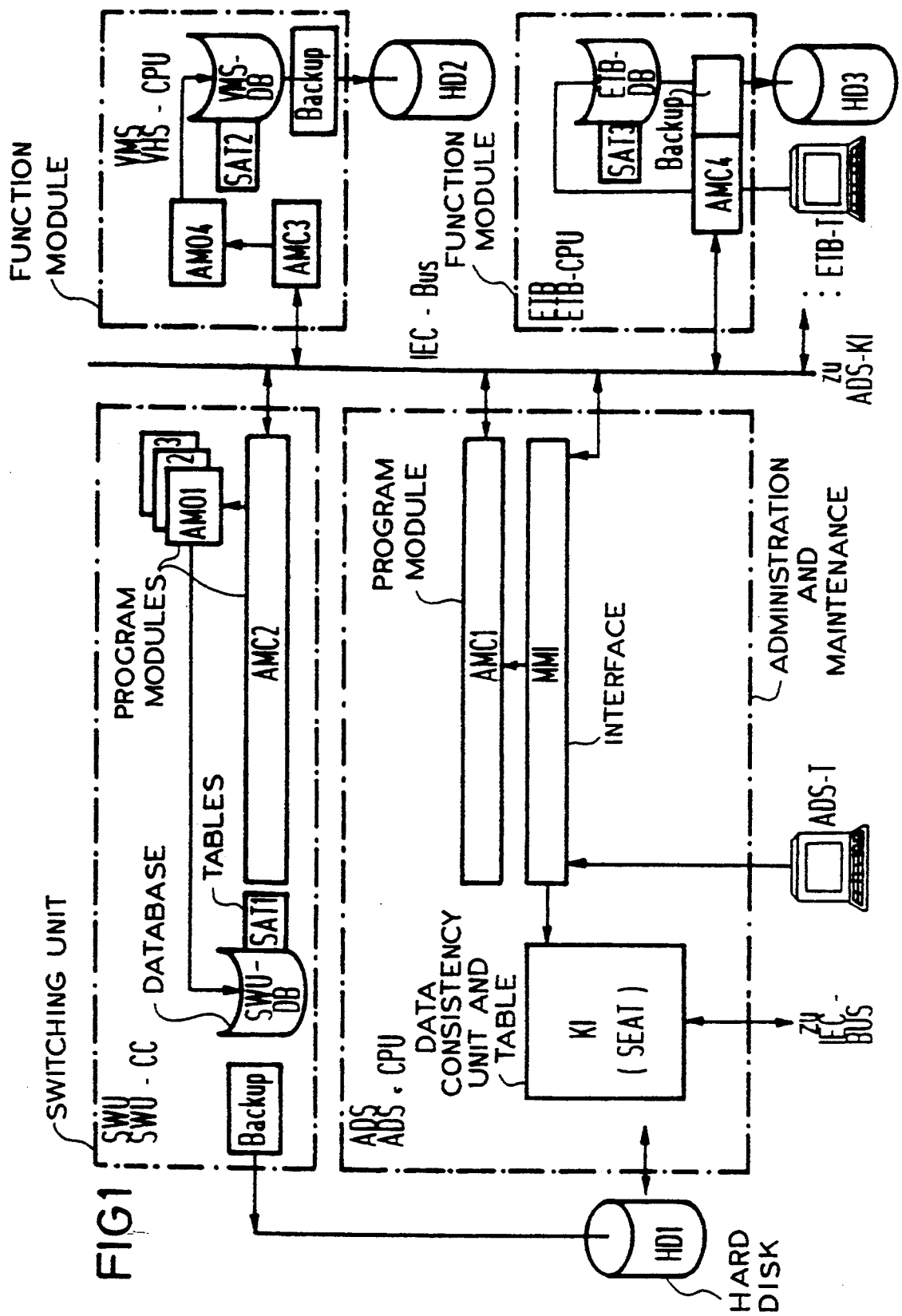

FIG 2a

| SEAT DB / AMO | SWU-DB | | | VMS-DB | | | ETB-DB | | | ... |
|---|---|---|---|---|---|---|---|---|---|---|
| ABC | | | | x | M | 17 | | | | |
| SCSU | x | M | 108 | | | | x | | 108 | |
| SBCSU | x | M | 24 | | | | x | | 24 | |
| PERSI | x | M | 367 | x | | 366 | x | | 366 | |

FIG 2b

| SEAT DB / AMO | SWU-DB | | | | VMS-DB | | | | ETB-DB | | | | ... |
| | | | JST | SOLL | | | JST | SOLL | | | JST | SOLL | |
|---|---|---|---|---|---|---|---|---|---|---|---|---|---|
| ABC | | | | | x | M | 17 | 17 | | | | | |
| SCSU | x | M | 108 | 108 | | | | | x | | 108 | 108 | |
| SBCSU | x | M | 24 | 25 | | | | | x | | 24 | 24 | |
| PERSI | x | M | 367 | 367 | x | | 366 | 366 | x | | 366 | 367 | |
| BACKUP | | | 6 | 6 | | | 6 | 6 | | | 5 | 5 | |

FIG 2c

SAT 1(SWU)

| SCSU | 108 |
| SBCSU | 24 |
| PERSI | 367 |
| BACKUP | 6 |

FIG 2d

SAT 2(VMS)

| ABC | 17 | M |
| PERSI | 366 | |
| BACKUP | 6 | |

FIG 2e

SAT 3(ETB)

| SCSU | 108 |
| SBCSU | 24 |
| PERSI | 366 |
| BACKUP | 5 |

FIG 2f

| LOG 5 | | | | |
|---|---|---|---|---|
| Lfd. Nr. | | SWU-DB | VMS-DB | ETB-DB |
| 1 | AMO 5.1 - KDO | X | | X |
| 2 | AMO 5.2 - KDO | X | | - |
| ⋮ | | | | |

FIG 2g

| LOG 6 | | | | |
|---|---|---|---|---|
| Lfd. Nr. | | SWU-DB | VMS-DB | ETB-DB |
| 1 | AMO 6.1 - KDO | X | | - |
| ⋮ | | | | |

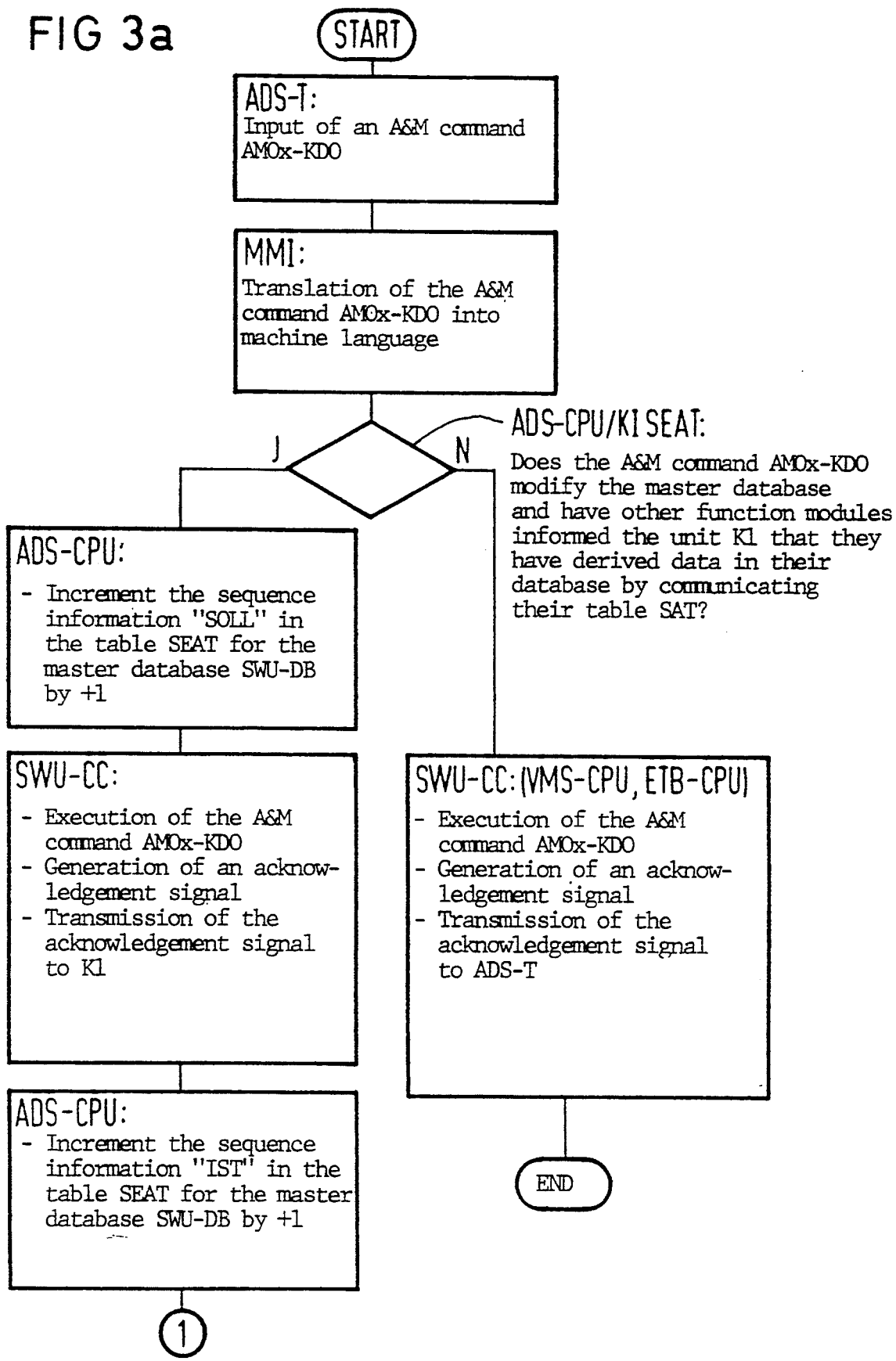

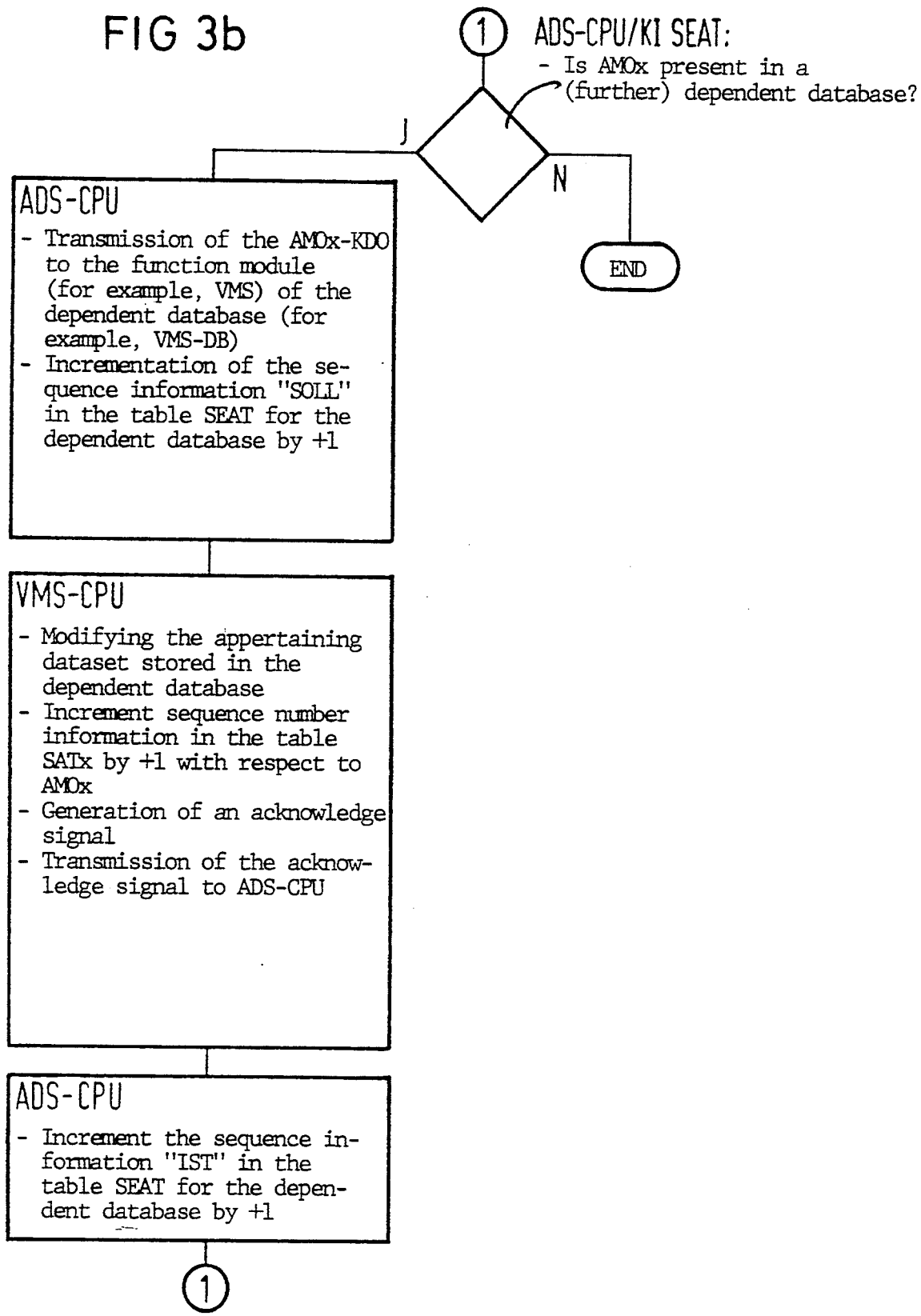

FIG 4a

ADS-CPU
- Triggered by the system administration and maintenance computer program or by an A&M command input into ADS-T or ETB-T:
- Generating database-associated instructions for producing a fifth backup copy
- Establishing a table LOG 5 individually associated to backup version

SWU-CC, VMS-CPU, ETB-CPU
- Generate rated backup version information incremented by +1
- Write these information into the tables SAT1, SAT2, SAT3
- Transmit these information to KI for entry into table SEAT by ADS-CPU
- Produce a respective backup copy of the databases SWU-DB, VMS-DB and ETB-DB
- Deposit the backup copies in HD1, HD2, HD3, respectively
- Generate IST backup version information incremented by +1
- Write these information into the tables SAT1, SAT2, SAT3
- Transmit these information to KI for entry into table SEAT by ADS-CPU

ADS-T, ETB-T
- Input of an A&M command AMO5.1-KDO whose execution modifies the content of the databases SWU-DB, ETB-DB

ADS-CPU
- Enter a command information characterizing the command AMO5.1-KDO into table LOG 5
- Enter the database-associated information that supplement the command information and that designate the non-execution of the command AMO5.1-KDO for the databases SWU-DB and ETB-DB into table LOG 5

FIG 4b

SWU-CC ETB-CPU
- Execute the A&M command AM05.1-KDO with respect to SWU-DB and ETB-DB
- Enter the database-associated information that supplement the command information and that indicates the execution of the command AM05.1-KDO for the respective database into table LOG 5
- Erase the database-associated information that supplement the command information and that indicate the non-execution of the command AM05.1-KDO for the respective database in table LOG 5

ETB-T, ADS-T
- Input of an A&M command AMOab-KDO with which the decoupling of the peripheral function module ETB is triggered

ETB-CPU, ADS-CPU
- Decoupling of the function module ETB

ADS-T
- Input of an A&M command AM05.2-KDO for modifying the content of the databases SWU-DB and ETB-DB

FIG 4c

ADS-CPU
- Write a command information designating the command AM05.2-KDO into table LOG 5
- Write database-associated information that supplement the command information and that indicate the non-execution of the command AM05.2-KDO for the databases SWU-DB and ETB-DB into table LOG 5

SWU-CC
- Execute the A&M command AM05.-KDO with respect to SWU-DB
- Write the database-associated information that supplements the command information and that indicates the execution of the command AM05.2-KDO for the database SWU-DB into table LOG 5
- Erase the database-associated information that supplements the command information and that indicates the non-execution of the command AM05.2-KDO for the database SWU-DB in table LOG 6

ADS-CPU
- Triggered by the system administration and maintenance computer program or by an A&M command input into ADS-T:
- Generate database-associated instructions for producing a sixth backup copy
- Transmitting these instructions to the function modules SWU and VMS
- Establishing a table LOG 6 individually associated the backup version

FIG 4d

SWU-CC, VMS-CPU
- Generate rated backup version information incremented by +1
- Write these information into the tables SAT1 and SAT2
- Transmit these information to K1 for entry into table SEAT by ADS-CPU
- Produce a respective backup copy of the databases SWU-DB and VMS-DB
- Deposit the backup copies in HD1 and HD2
- Generate actual backup version information incremented by +1
- Write these information into the tables SAT1 and SAT2
- Transmit these information to K1 for entry into table SEAT by ADS-CPU

ADS-T
- Input an A&M command AM06.1-KDO for modifying the content of the databases SWU-DB abd ETB-DB

ADS-CPU
- Write a command information indicating the command AM06.1-KDO into table LOG 6
- Write database-associated information that supplement the command information and that indicate the non-execution of the command AM06.1-KDO for the databases SWU-DB abd ETB-DB into table LOG 6

FIG 4f

For table LOG 6, AM06.1-KDO ──────────→ ↓X

LOG 6, AM06.1-KDO

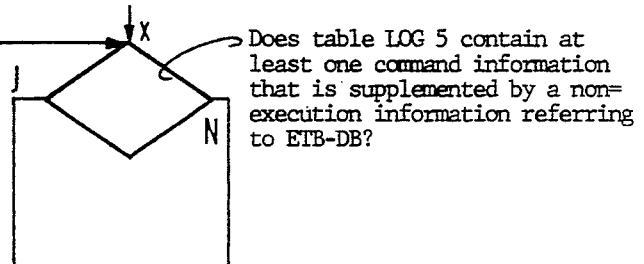
Does table LOG 5 contain at least one command information that is supplemented by a non-execution information referring to ETB-DB?

ADS-CPU, ETB-CPU
- Processing the appertaining command AM05.2 with respect to ETB-DB
- Writing the database-associated information that supplement the command information and that indicates the execution of the commands AM05.2-KDO, ..., for the database ETB-DB into table LOG 5
- Erase the database-associated information that supplement the command information and that indicates the non-execution of the command AM05.2-KDO, AM0 for the database in table LOG 5

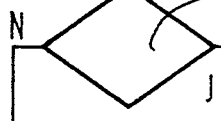
                                                      actual
Is the/backup version information for SWU-DB in table SEAT the same as the actual backup version information for ETB-DB?

ETB-CPU
- Produce a backup copy of the database ETB-DB
- Deposit the backup copy in HD3
- Generate actual backup version information incremented by +1 for table SAT3
- Transmit these information to K1 for entry into table SEAT by ADS-CPU ↓
X (for table LOG 6, AM06.1-KDO)

( END )

METHOD FOR MODIFYING SYSTEM CONFIGURATION DATA SETS IN A TELECOMMUNICATIONS SWITCHING SYSTEM

BACKGROUND OF THE INVENTION

The configuration level of modern telecommunications switching systems is described by configuration data that, combined to form data sets are stored in corresponding memories. The plurality of system configuration data is thereby dependent on the extent of the system upgrading (number of connected or connectable terminal equipment; performance features individually associated with terminal equipment; exchange lines, etc.) as well as on the structure of the memories or data files present in the system.

A publication published by Siemens AG (Special Issue of Telcom Report and Siemens Magazine COM "ISDN in the Office" December 1985, Ordering No. A19100-L523-V849 X 6700, ISBN 3-8009-3849-9, pages 56–64 and 92–103) discloses a telecommunications switching system to which can be connected analog and digital telephones, telecopiers, multifunctional terminals, work station systems, personal computers, teletex and videotex stations and terminal equipment.

The administration and maintenance software of the known switching system already has program modules that serve the purpose of assuring data consistency. Assuring the database consistency when modifying static data is thereby achieved by what are referred to as update program parts and by special coordination mechanisms that are comprised in depositing the modifiable static data in the system composed of function modules (switching unit, peripheral function modules) in parallel in a main memory of the appertaining function module and in backup memories. It is thereby also provided that modified parts of the database are updated automatically at cyclical intervals or manually by administration and maintenance program modules on a hard disk. The known switching system, however, does not provide any special measures for the case when peripheral function modules are temporarily disconnected from the system. For example, peripheral function modules are temporarily disconnected from the system during maintenance jobs.

It is known from Bergmann, Lehrbuch der Fermeldetechnik, Vol. 2, Berlin 1986, pages 1573–1574, to establish a protocol data file in addition to the periodic production of backup copies for data recovery in the case of loss. All accesses that lead to modifications of the database are logged in this protocol data file. When the database is destroyed, the backup copy can first be written back in and all modifications that occurred since the backup copy was produced can be duplicated with a utility program on the basis of the log file. System-peripheral units, however, are not taken into consideration in this context.

European Patent Application EP 0 237 841 A1 discloses a method for processing configuration modifications in a data processing system and an apparatus for the implementation of this method. The content of a configuration memory and the content of one or more function modules are thereby modified in a fixed sequence of the modify procedures. Here, too, no special measures are provided for that case wherein peripheral function modules are temporarily disconnected from the system.

SUMMARY OF THE INVENTION

In this context, the present invention is based on the problem of also assuring data consistency for a telecommunications switching system of the type initially cited in cases wherein peripheral function modules are temporarily disconnected from the system.

Proceeding on the basis of the prior art, this problem is resolved by a method of the present invention for modifying system configuration data sets in a telecommunications switching system that has first function modules for processing switching-oriented and/or administration and maintenance procedures and second peripheral function modules for the realization of supplementary performance features. At least a part of the first function modules and at least a part of the second function modules have databases with system configuration data sets. At least one sub-set of corresponding system configuration data sets is stored in more than one database, whereby, triggered by administration and maintenance commands input into the system, the system configuration data sets can be modified by a system administration and maintenance computer program. The system administration and maintenance computer program produces database-associated backup copies of the content of at least a part of the databases and the backup copies are deposited in memories that are separate from the respective database. The system administration and maintenance computer program controls the system in such a way that, essentially isochronically with the production of database-associated backup copies, the administration and maintenance commands subsequently input into the system that modify database contents are listed in the form of command information in the chronological sequence of their occurrence. Every command information is supplemented with a database-associated information that indicates the implementation or the non-implementation of the respective administration and maintenance commands. Given a connection of a database of a previously disconnected peripheral function module to the system, the administration and maintenance commands corresponding to the listed command information that are supplemented by a non-implementation information are processed in the listed sequence.

The method of the present invention is first distinguished by the advantage that the contents of the databases of peripheral function modules that are temporarily disconnected from the system are not centrally deposited in the system. A further advantage is that peripheral function modules can be provided for the telecommunications switching system in ongoing operation or even before the first initialization. The required data consistency can be reliably and quickly produced upon the occasion of a later, initial coupling of the function modules to the system without having to modify the system in terms of its circuit-oriented structure.

According to another advantageous embodiment of the present invention, a central-backup-copy-associated table is formed after every production of backup copies of the contents of all databases of the system, the administration and maintenance commands input into the system that modify the contents of specific databases being written into this table. The corresponding command information is supplemented by information that individually identify the implementation or non-implementation of the appertaining, administration and maintenance command for each affected database. As a result thereof, the data consistency can also be reliably realized for a plurality of function modules even when some of the function modules are temporarily disconnected from the system or are only connected to the system for a first time at a later point in time.

It is inventively provided according to another embodiment that the procedures initiated by the connection and disconnection of peripheral function modules are triggered by administration and maintenance commands that are manually input into the system or by information produced internally in the system that identifies the connection status of the peripheral function modules. This latter alternative makes it possible to implement the method of the present invention in cases wherein assemblies of peripheral function modules are disassociated from the system circuit or are (re-)introduced thereinto without corresponding administration and maintenance commands being required.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 is a schematic illustration of the administration and maintenance hardware and software components of a telecommunications switching system with which the method of the invention can be implemented;

FIGS. 2a–2g are tables that system computers access in the procedures for assuring the database consistency;

FIGS. 3a and 3b depict a flowchart of the administration and maintenance procedures for producing the data consistency that are implemented with the telecommunications switching system of FIG. 1 in those instances wherein all peripheral function modules are connected to the system; and FIGS. 4a–4f depict a flowchart of the method of the present invention.

DESCRIPTION OF THE PREFERRED EMBODIMENT

Figure 4E:
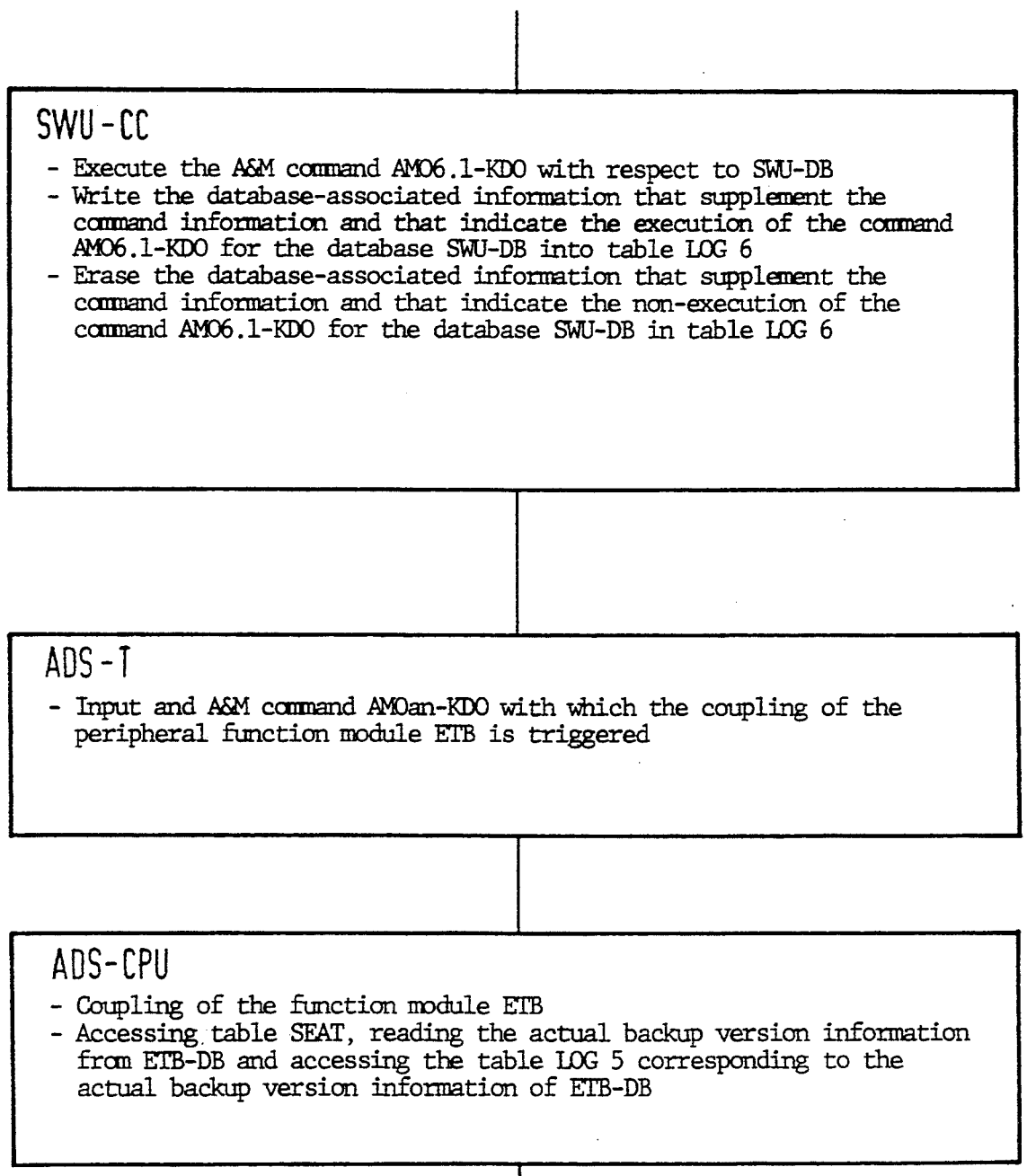

The telecommunications switching system schematically shown in FIG. 1 in terms of its administration and maintenance hardware or software structure can be fundamentally constructed similar to the system disclosed in published European Patent Applications: EP 0 306 693 A1 (corresponding to U.S. Pat. No. 4,903,258), EP 0 303 870 A2 (corresponding to U.S. Pat. No. 5,018,097), and EP 0 303 869 A1 (corresponding to U.S. Pat. No. 5,047,923). U.S. Pat. Nos. 4,903,258; 5,018,097; and 4,903,258 are hereby incorporated by reference.

The software architecture of the known switching system is based on the following criteria:

The first architecture criterion is directed to the three-part division of the switching software into the function complexes of peripheral processing, device handler and call processing. The peripheral processing PP thereby handles the transport functions and essentially sequences on the line/trunk modules for the terminal equipment and lines. The device handler has the function of matching the interface to the peripheral processing to the ISDN interfaces of the call processing. The call processing produces the actual performance for the user surfaces of the terminal equipment or, respectively, for the interfaces to the various sets.

The second architecture criterion represents the status or, respectively, event processing in the call processing oriented with respect to the services and terminal equipment. The service criterion is offered as ISDN protocol element of the control software that identifies the device type in service-associated fashion on the basis of the co-supplied device address.

The third architecture criterion for simple handling of the multitude of terminal equipment and services is strict application of the dedicated database which the programs fundamentally access only on the logical level.

The telecommunications switching system shown in FIG. 1 comprises four function modules SWU, ADS, VMS and ETB. The function module SWU represents a switching unit that is composed of a switching network (not shown) and of a central computer SWU-CC that is preferably formed by a multi-processor control. The function module ADS is an administration and maintenance unit whose function for the administration and maintenance interaction with the remaining function modules of the system shall be set forth in the course of the further specification. Peripheral, task-oriented function modules, for example a function module VMS for the intermediate storage of voice messages as well as a function module ETB with which an electronic telephone book is administered are connectable to the two, afore-mentioned function modules via an IEC bus in terms of administration and maintenance. In addition thereto, further peripheral, task-oriented function modules, for example a function module for the automatic distribution of calls (automatic call distribution), which can be structured like the function module VMS, can be incorporated into the system. The function modules ADS, SWU and VMS have administration and maintenance computer program modules AMC1, AMC2, AMC3 allocated to them. The modules AMC2 and AMC3 that are allocated to the function modules SWU and VMS have the job of controlling the communication of the administration and maintenance commands between the individual function modules and of starting the program modules AMO1, AMO2 and AMO3 or, respectively, AMO4. To this end, these program modules are loaded from the corresponding hard disks HD1 or, respectively, HD3 into intermediate memories (not shown) individually associated to the function modules. The modules AMC also have the job of managing the second table SAT yet to be set forth. The module AMC1 in the illustrated exemplary embodiment only has the job of command forwarding. The module AMC4 that is allocated to the function module ETB only has the job of managing the second table SAT3.

The function module SWU has three program modules AMO1, AMO2 and AMO3 allocated to it that are referenced SCSU, SBCSU and PERSI in the table SEAT shown in FIGS. 2a and 2b. These three program modules modify system data configuration sets that are stored in the database SWU-DB and that, as the table SEAT likewise shows, are deposited in the database VMS-DB. The database SWU-DB is what is referred to as the master database for AMO1 (equals SCSU), AMO2 (equals SBCSU) and AMO3 (equals PERSI), i.e. a database of a higher-ranking hierarchy level, whereas the database VMS-DB for AMO1, AMO2 and AMO3 is what is referred to as a dependent or slave database, i.e. a database of a lower-ranking hierarchy level. VMS-DB is the master database for AMO4; the appertaining dependent database is not shown.

The database of the function module ETB does not have the status of a master database with respect to any system configuration data sets, so that no program module AMO is allocated to the function module ETB.

The function modules SWU, VMS, ETB each have an aforementioned dedicated database SWU-DB, VMS-DB and ETB-DB available to them. It is assumed that at least some of the data sets of system configuration data are stored in more than one of the databases. The remainder of the specification refers to these data sets insofar as other properties of the data sets are not cited. In order to assure the data consistency required for proper system operation, data sets for example telephone number and name of a subscriber, must be modified in every affected database (see the AMO "PERSI" in FIG. 2 serving the purpose of personal identification). Among other things, a respectively known "backup" function and background memories HD1, HD2, HD3 (hard disk HD) are provided for securing the data sets and tables (SEAT, SAT1 ... SATx) stored in the databases.

The administration and maintenance unit ADS can be connected to an administration and maintenance terminal equipment ADS-T. This serves the purpose of inputting administration and maintenance commands AMO-KDO. The administration and maintenance terminal equipment ADS-T is in communication with the unit MMI (man-machine interpreter) that is formed by a text processor program module that serves the purpose of converting command information—for example, according to the CCITT man-machine language—into application-suited data information. Further sub-tasks of the text processor program module MMI are the syntax check, the analysis of commands according to parameter tree definition parsing, the implementation of individual parameter checks with respect to application-related data tables and the editing of output texts.

Every command that can be input into the terminal equipment ADS-T or into a potentially further terminal equipment ETB-T is composed of three parts: of an identification of the administration and maintenance job AMO1, AMO2, AMO3 or AMO4; of a designation of the action to be undertaken such as, for example, "modify", "erase" "interrogate"; and of parameter data such as, for example, a subscriber telephone number, that specify the respective administration and maintenance job and the action. Commands that are limited to an interrogation and do not lead to a modification of system configuration data sets shall not be considered here.

The unit MMI is in communication with a unit KI that is in turn connected to the backup memory HD1 and to the IEC bus that connects the function modules. A unit K1 is active in the controller ADS-CPU, this unit K1 carrying out the actual job of preserving the data consistency of all system databases, whereby it uses the table SEAT.

Among other things, multiple system configuration data sets are stored in the databases of the system, and to be kept consistent system-wide. Thus, for example, a telephone number 123 and the appertaining name "Mr. X." of a subscriber is stored both in the database SW-DB for display at digital terminal equipment as well as in the database ETB-DB for the actual telephone book function. When the appertaining name or, respectively, the allocation of telephone number and name change, then the corresponding data set must be modified in the same way in the two afore-mentioned databases.

The system illustrated in FIG. 1 is equipped such that two administration and maintenance terminal equipment ADS-T and ETB-T can be connected to the administration and maintenance unit ADS or, respectively, to the peripheral function module ETB. Administration and maintenance jobs that are implemented upon employment of the program module AMO allocated to the respective function module can be input into these terminal equipment.

The telecommunications switching system shown in FIG. 1 has a plurality of system computers, whereby the switching unit SWU has a central system computer SWU-CC allocated to it and the function modules ADS, VMS and ETB have one or more decentralized computers ADS-CPU, VMS-CPU, ETB-CPU allocated to them. However, a telecommunications switching system of the present invention can also have only one computer that then carries out all administration and maintenance jobs occurring in the system and is thus computer-independent.

The unit KI has a table SEAT (surveillance entity AMO table) that indicates the allocation of all program modules (AMO1, ..., AMOn) present in the system to the respective function-module-associated databases SWU-DB, VMS-DB and ETB-DB.

Examples of such a table SEAT are shown in FIGS. 2a and 2b. The first column lists program modules AMO, whereas allocation data is recited in the blocks respectively composed of three or, respectively, four columns that are respectively allocated to a function module database SWU-DB, VMS-DB, ETB-DB, ... In the illustrated example, the program modules AMO are referenced SCSU, SBCSU and PERSI. The program module SCSU (subscriber configuration switching unit) serves the purpose of memory entries that are necessary for the subscriber configurations; the program module SBCSU (subscriber bus configuration switching unit) serves the purpose of memory entries that are necessary for the configuration of subscribers at the So bus; and the program module PERSI (personal identification) serves the purpose of memory entries of person-related data (for example, name of a subscriber). The further program module ABC listed in the table SEAT is a program module that, for example, serves the purpose of configuring voice mailboxes.

The function modules SWU, VMS and ETB have individual databases SWU-DB, VMS-DB and ETB-DB allocated to them that differ in terms of their hierarchy. As shall be set forth later, what is referred to as a master database and at least one hierarchically lower-ranking, dependent database is provided for each program module AMO.

The symbol "x" denotes that the respective program module AMO or, respectively, a system configuration data set to be modified by the appertaining program module is allocated to the respective function-module-associated database. The information "M" that can appear in the second block column indicates that the database of the respective function module is what is referred to as the master database for the appertaining program module or, respectively, for the appertaining system configuration data set. The information "M" must appear exactly once per row in the table SEAT.

Master database refers to the database that is involved in a first modification step given modification of a system configuration data set, whereas further databases of function modules that, due to the lack of an information "M" in the table shown in FIG. 2a, represent a dependent database for the system configuration data set to be modified by the appertaining program module AMO and that are only involved in the modification process in a second or a following modify step when handling administration and maintenance jobs.

The respectively third column contains an additional, third datum "IST" in a block that indicates the number of actual operations of the appertaining program module AMO.

For example, the program module AMO or, respectively, the appertaining system configuration data set SCSU has the numerical operation information 108 allocated to it, namely for the databases of the function module SWU and of the peripheral function module ETB. By contrast, the program module PERSI for the function module database SWU-DB has the numerical operation information 367, whereas the corresponding version information for the peripheral function modules VMS and ETB reads 366.

These different numerical operation information indicate that the system configuration data set related to the program module PERSI is to be modified in the databases of the function modules VMS and ETB. At the point in time shown in the table SEAT, the system configuration data set PERSI is not data-consistent system-wide.

As the entries "M" in FIG. 2a show, the database SWU-DB is the master database for the system configuration data sets related to the program modules SCSU, SBCSU and PERSI, whereas the databases of the remaining function modules VMS-DB and ETB-DB are dependent databases for the three afore-mentioned system configuration data sets. The database of the function module VMS is the master database for the system configuration data set related to the program module ABC.

The table SEAT shown in FIG. 2b contains a further block column for every database that contains a fourth datum "SOLL" for every administration and maintenance program module AMO that indicates the scheduled number of operations of each and every program module to be implemented. The last row of the table SEAT having the designation "BACKUP" shall be considered later.

The databases SWU-DB, VMS-DB and ETB-DB have allocated to them the tables SAT1, SAT2 and SAT3 shown in FIGS. 2c, 2d and 2e, whereby the respectively last row having the designation "BACKUP" shall first be left out of consideration. These tables indicate what program modules AMO modify system configuration data sets in the database of the appertaining function module that simultaneously modify data sets in the master database (SWU-DB in the present case). The program modules SCSU, SBSCU and PERSI are allocated to the peripheral function modules VMS. This information is supplemented by a numerical operation information that indicates the plurality of modifications in the respective function-associated database.

The table illustrated in FIG. 2b that is allocated to the database VMS-DB is supplemented, in addition to the numerical operation information in the second column, by an information "M" in the third column that indicates that the database VMS-DB of the function module VMS is the master database for the program module ABC recited in the first row or, respectively, for the appertaining system configuration data set. When a corresponding entry "M" is lacking in the tables SAT1 . . . SATx, then the database SWU-DB is the master database for the appertaining program module (SCSU, SBSCU, PERSI).

The second tables SAT1 . . . SAT3 are derived in program-oriented terms from the system configuration data sets stored in the respective databases SWU-DB, VMS-DB and ETB-DB and are respectively deposited on the appertaining backup memories HD1, HD2 and HD3. At every run-up of the function modules SWU, VMS and ETB, the content of the tables SATx is communicated to the unit KI that forms the table SEAT from the communicated information.

The table SEAT shown in FIG. 2b shows coinciding scheduled and actual numerical operation information for the data sets related to the program modules ABC and SCSU, so that one must proceed on the basis of the data consistency of the configuration data sets stored in the corresponding databases.

It may be derived from the table SEAT in FIG. 2b for the configuration data set to be modified by the program module SBCSU that the master database SWU-DB has been informed of the data set modification to be implemented, having been informed on the basis of a command inputted into an administration and maintenance terminal equipment (ADS-T, ETB-T) (scheduled numerical operation information=25). However, the data set modification has not yet been implemented in the master database SWU-DB (actual numerical operation information=24). The dependent database ETB-DB has not been informed of the modification to be implemented and the modification has not been implemented (scheduled and actual numerical operation information are both 24).

It may be derived from the table SEAT in FIGS. 2a and 2b for the configuration data set to be modified by the program module PERSI that the modification to be implemented has been implemented in the master database PERSI. The first dependent database ETB-DB has been informed of the modification to be implemented; the modification, however, has not yet been implemented. The second dependent database VMS-DB has not been informed of the modification to be implemented and the modification has not been implemented.

The processing of an administration and maintenance job shall be set forth below with reference to the flow-chart shown in FIGS. 3a and 3b.

An administration and maintenance command AMO1-KDO1 is input into the administration and maintenance terminal equipment ADS-T of the unit ADS, this command, as already stated above, being composed of three constituent parts and being intended to lead to the modification or erase of a system configuration data set. The request is supplied to the unit MMI that converts the input signals into application-suited data information in a known way. The controller ADS-CPU of the administration and maintenance unit ADS accesses the unit KI and, on the basis of the table SEAT stored therein, identifies whether the administration and maintenance job indicated in the command and the action that is likewise indicated effects a modification of the master database for which other function modules have communicated an interest in the data via their tables SAT. When, in the example illustrated in FIGS. 2a or 2b, a command is input that relates to one of the four, recited program modules ABC, SCSU, SBCSU and PERSI, then this check leads to a positive result.

The master database VMS-DB (for ABC) or, respectively, the master database SWU-DB (for SCSU, SBCSU and PERSI) is thus to be modified.

It is now assumed that the database SWU-DB of the switching unit is to be modified by the recited, administration and maintenance job. First, the scheduled numerical operation information is incremented by +1 in the table SEAT for the master database SWU-DB. The command is now forwarded via the IEC bus to the function module SWU and is processed there with the corresponding AMO. As a result, the modified system configuration data set is written into the database SWU-DB. The respective program module AMO acknowledges the proper handling of the corresponding administration and maintenance job AMO and forwards this acknowledgement via the IEC bus to the unit KI and to the input terminal ADS-T. The unit increments the corresponding numerical operation information "IST" by +1. Following thereupon, the table SEAT is interrogated to the affect to see whether the corresponding system configuration data set is to be modified in another, i.e. in a dependent database of the system.

This is the case here for the database VMS-DB. The corresponding command AMO-KDO1 is supplied unmodified via the IEC bus to the function module VMS and is handled there in an analogous way. After a successful conclusion of the second modify step, the numerical operation information in the table SAT of the function module ETB is likewise incremented by +1. The controller VMS-CPU likewise forms an acknowledgement signal and conducts this via the IEC bus to the unit K1 wherein the table SEAT is updated with respect to the numerical operation information.

Administration and maintenance jobs can also be input into the terminal equipment ETB-T. When this job, for example, affects the program module or, respectively, a system configuration data set PERSI, then this job is supplied to the unit MMI and KI via the IEC bus. The further handling proceeds in the manner that was set forth with reference to the flowchart. As FIGS. 2a through 2e show, the database of the function module SWU is the master database for the program module PERSI, so that the first modify step is implemented in view of the data set stored in the database SWU-DB, whereas the databases of the function modules VMS and ETB are updated in a second or, respectively, third modify step.

It follows from the above description that the second tables SATx are derived in program-oriented terms from the system configuration data sets stored in the appertaining databases. At every run-up of the appertaining function modules, the content of these tables SATx is communicated to a unit KI that forms the table SEAT from the communicated information. Upon input of an administration and maintenance command, a scheduled numerical operation information SOLL is incremented by +1 in the table SEAT for the system configuration data set that is related to the administration and maintenance job AMO recited in the command. As a result, the system configuration data set stored in the master database is modified, this triggering the formation of an acknowledgement signal. This is supplied to the unit KI that increments the corresponding actual numerical operation information IST by +1. As a result, the corresponding, dependent database or, respectively, the corresponding numerical operation information is handled in the same way.

After the modification of the system configuration data set in the master database, the administration and maintenance command is communicated unmodified to the dependent database or databases. The respective, dependent database thereby extracts only a data subset of interest to it from the parameter data contained in the administration and maintenance command.

It shall now be assumed below that a peripheral function module, for example ETB, is disconnected from the telecommunications switching system and will be reconnected to the telecommunications switching system at a later time. The corresponding procedures shall now be set forth with reference to the flowchart shown in FIGS. 4a-4f, as well as, with reference to the tables shown in FIGS. 2b through 2d, particularly including the respectively last row having the designation "BACKUP" in FIGS. 2f and 2g.

During ongoing system operation, the system administration and maintenance computer program produces backup copies of the content of at least a part of the databases SWU-DB, VMS-DB and ETB-DB. The backup copies are deposited in memories separate from the respective database. In particular, the contents of the databases SWU-DB, VMS-DB and ETB-DB are deposited in the memories HD1, HD2 and HD3. These procedures can also be automatically triggered in a known way by the system administration and maintenance computer program at cyclical intervals or can be manually triggered by inputting specific administration and maintenance commands into the terminal equipment ADS-T or ETB-T The production of the backup copies and their deposit in the memories ideally occurs isochronically for all function modules SWU, VMS, ETB. Within the framework of the method of the present invention, the respective "BACKUP" versions are provided with a corresponding numerical information, whereby scheduled and actual <SOLL and IST> information <> are particularly formed. As soon as a corresponding administration and maintenance command is input into the system or the system administration and maintenance computer program initiates the production of a backup copy, the backup version SOLL information in the table SEAT (FIG. 2b) is incremented by +1. When the corresponding procedures, i.e. the production of a backup copy for a prescribed database and the deposit of the respective backup copy in a memory, have been successfully concluded, then the corresponding backup version IST information is incremented by +1. This information is written into the tables illustrated in FIGS. 2b through 2e.

These events are triggered by the controller ADS-CPU of the administration and maintenance unit ADS. In particular, these procedures are first implemented for the switching unit SWU and, following thereupon, for the further function modules, namely by the respective function-module-associated controllers SWU-CC, VMS-CPU and ETB-CPU. The function-module-associated controllers thereby also administer the tables shown in FIGS. 2c through 2e that, among other things, can contain the actual information IST of the respective "BACKUP" version. As soon as a "BACKUP" version IST information has been written into one of the tables SAT1, SAT2, SAT3, the corresponding information is transmitted to the unit KI in the function module ADS and is written into the table SEAT thereat (FIG. 2b). Given a proper operation of the system, whereby all peripheral function modules are connected, the IST and "BACKUP" information for all function module databases SWU-DB, VMS-DB, ETB-DB in the table SEAT are identical.

It is now assumed that the peripheral function module ETB is disconnected from the system after the production of the fifth database-associated backup copies and their deposit into the corresponding memories HD1, HD2 and HD3. The appertaining database ETB-DB is thus not updated, and the "BACKUP" version IST or, respectively, SOLL information thereby remain "5/5".

The system administration and maintenance computer program is also structured in such a way that, essentially isochronically with the production of database-associated backup copies, the administration and maintenance commands AMO5.1-KDO, AMO5.2-KDO, . . . , input into the system thereafter that modify database contents are listed in the form of command information in the chronological sequence of their occurrence. Tables having such a listing are shown in FIGS. 2f and 2g. Administration and maintenance commands AMO5.1-KDO, AMO5.2-KDO having the running numbers 1 and 2 are schematically shown in the table LOG5 for the "BACKUP" version "5". For every administration and maintenance command, the function-module-associated controller writes a database-associated information into the table LOG that indicates the implementation or non-implementation of the respective administration and maintenance command.

The information for the implementation of an administration and maintenance command is referenced "X" in the tables of FIGS. 2f and 2g and the information for the non-implementation of the corresponding administration and maintenance command is referenced "-" therein.

In particular, the controller ADS-CPU enters a database-associated information "-" into the table LOG together with a command information that indicates an administration and maintenance command that modifies database contents, this information "-" indicating the non-implementation of this command for the appertaining databases. When, after the implementation of the command by the respective function-module-associated controller, the corresponding information is reported to the controller ADS-CPU, then the latter writes this information "X" into the table LOG and thus erases the information "-".

In the examples shown in FIGS. 2f and 4a–4f, the administration and maintenance command AMO5.1-KDO has been implemented for the database SWU-DB as well as for the database ETB-DB, whereas the command AMO5.2-KDO has been implemented only for the database SWU-DB. The reason for this is the disconnection of the function module ETB after the implementation of the command AMO5.1-KDO.

As a result, sixth database-associated backup copies are produced for the function modules SWU and VMS that continue to be connected to the system and these backup copies are deposited in the memories HD1 and HD2. The controller ADS-CPU sets up a table LOG6 (FIG. 2g) into which a command information is written with respect to the command AMO6.1-KDO and database-associated information regarding the implementation/non-implementation of this command.

It is now assumed that the function module ETB is reconnected to the system at a time at which the actual "BACKUP" information IST or, respectively, scheduled "BACKUP" information SOLL for the databases SWU-DB and VMS-DB reads identically as "6/6" (FIGS. 2b, 2c, 2d). The controller ADS-CPU of the function module ADS accesses the table SEAT shown in FIG. 2 and derives from this table that the function module ETB was disconnected from the system at a time at which the actual "BACKUP" information IST or, respectively, scheduled "BACKUP" information SOLL read "5/5". The controller ADS-CPU now accesses the table LOG5 shown in FIG. 2f and checks whether administration and maintenance commands are listed in the table LOG5 that are supplemented by an information "-" for the database ETB-DB, this information indicating the non-implementation of the appertaining command. This is true of the command AMO5.2-KDO in the example being set forth. The controller ADS-CPU now supplies the corresponding information that corresponds to the first administration and maintenance command AMO5.2-KDO that was not implemented for the database ETB-DB to the re-connected peripheral function module ETB, whose controller ETB-CPU implements the appertaining, administration and maintenance command. In the same way, potential further administration and maintenance commands of the table LOG5 and, following thereupon, the administration and maintenance commands AMO6.1-KDO, . . . , of the table LOG6 that are originally supplemented with the information "-" in the column ETB-DB are successively implemented. After the commands (AMO5.2-KDO) of the table LOG5 supplemented with the information "-" have been implemented, the controller ADS-CPU increments the backup version information SOLL to "6" and initiates the controller ETB-CPU to deposit the content of the database ETB-DB in the memory HD3. Immediately following this deposit, the controller ETB-CPU modifies the backup version information IST "5" of the table SAT3 to read "6" and reports this updating of the information to the controller ADS-CPU, this then being also implemented in the table SEAT (FIG. 2b). (backup version IST information "6".) It then agrees with the scheduled information "6".

After every implementation of one of the commands AMO5.2-KDO, AMO6.1-KDO, the controller ETB-CPU provides the controller ADS-CPU with a corresponding acknowledgement message that initiates the controller ADS-CPU to update the implementation/non-implementation information in the tables LOG5 and LOG6. After the controller ETB-CPU has implemented all administration and maintenance commands that were originally not implemented, it generates updated "BACKUP" IST information, enters this into the table SAT3 shown in FIG. 2e and sends this to the unit KI whereat the information is also written into the table SEAT shown in FIG. 2b.

The method of the present invention can also be applied in the manner depicted in FIG. 4a–4f, wherein it was not a peripheral function module originally connected to the system that is disconnected and later reconnected to the system but wherein a new peripheral function module is connected to the system for a first time at a later time.

In this case, the administration and maintenance command AMOab-KDO depicted in FIG. 4a–4f is replaced by a corresponding command with which a peripheral function module to be connected to the system for the first time later is reported. The controller ADS-CPU expands the currently updated table LOGx ("LOG5" in the present case) by a new column for the new peripheral function module. The controller ADS-CPU also expands the table SEAT by the corresponding memory locations (FIG. 2b). The controller ADS-CPU enters the scheduled and actual backup version information of the master database, for example SW-DB, allocated to the new peripheral function module into the row "BACKUP" of the table SEAT for the new peripheral function module.

At the same time, the master database (for example, SWU-DB) produces a dump that is deposited in an external storage medium, for example HD1. With, for example, an external computer, the data sets relevant for the new peripheral function module are extracted from this data dump that, at the time it is produced, represents an identical copy of the content of the master database. A new database is formed from these extracted data sets and, potentially, from function-module-associated data sets, the content of this new database being transferred into the database of this system when the new peripheral function module is connected to the system. After the connecting, which can be triggered by the administration and maintenance command AMOan-KDO shown in FIG. 4e, the administration and maintenance commands stored in the tables LOG that are supplemented with a non-implementation information "-" are implemented, as set forth above. Alternatively, the system administration and maintenance computer program can control the switching system in such a way that the new database stored on the external storage medium, together with the administration and maintenance commands that modify its content, are already processed before the connection of the new peripheral function module. This processing following the actual connection is thus superfluous, so that the connected function module can be advantageously involved into ongoing synchronization procedures immediately after the connection.

The procedures initiated by the connection and disconnection of peripheral function modules can also occur without inputting corresponding administration and maintenance commands. To this end, the system can have a circuit arrangement as disclosed in European Patent Application having Publication No. EP 0 310 877 A1 (U.S. Ser. No. 249,289), hereby incorporated by reference. In order to be able to easily update identification data of individual system assemblies and have them polled by a signal collector, the identification data is input into EEPROMs with a setup computer and is interrogated address-selective and clock-controlled with the signal collector. In this way, the method of the present invention can be implemented, for example, in those cases wherein assemblies of peripheral function modules are disassociated from the system circuit or, respectively, are (re-)introduced thereinto without requiring the input of corresponding administration and maintenance commands into the system.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for modifying system configuration data sets in a telecommunications switching system that has first function modules for processing switching-oriented and/or administration and maintenance procedures and that has second function modules for the realization of supplementary performance features, at least a part of the first function modules and at least a part of the second function modules having respective databases with system configuration data sets, whereof at least one sub-set of corresponding system configuration data sets is stored in more than one database, the system configuration data sets being modified by a system administration and maintenance computer program when triggered by administration and maintenance commands input into the system, the system administration and maintenance computer program producing database-associated backup copies of at least a part of the databases and the backup copies being deposited in memories that are separate from respective databases, comprising the steps of:

listing by means of the system administration and maintenance computer program the administration and maintenance commands, that are subsequently input into the system that modify database contents, in the form of command information in the chronological sequence of their occurrence, the listing occurring substantially isochronically with the production of database-associated backup copies;

supplementing every command information with a database-associated information that indicates implementation or non-implementation of respective administration and maintenance commands; and processing, given a connection of a database of a previously disconnected second function module to the system, the administration and maintenance commands corresponding to the listed command information that are supplemented by a non-implementation information in the listed sequence.

2. The method according to claim 1, wherein the system administration and maintenance computer program enters administration and maintenance commands that modify database contents and that are input into the system after the production of database-associated backup copies, as well as, database-associated information indicating implementation or non-implementation of the respective administration and maintenance command into backup-copy-associated tables.

3. The method according to claim 1, wherein triggered by the input of an administration and maintenance command that indicates the application of a new peripheral function module to be connected to the system for a first time at a later time and that has a lower-ranking hierarchy level compared to a hierarchy level of a further function module, the system administration and maintenance computer program initiates the production of a copy of the database of the function module ranking hierarchically higher than the new peripheral function module; wherein data sets relevant for the new peripheral function module are extracted from this copy and the relevant data sets are utilized to form a new database from function-module-associated data; wherein, upon initial connection of the new peripheral function module, content of the new database is transferred into the database of the new peripheral function module; and wherein the administration and maintenance commands that are supplemented with non-implementation information and correspond to the listed command information are processed in the listed sequence.

4. The method according to claim 1, wherein connection and/or disconnection of peripheral function modules is triggered by administration and maintenance commands manually input into the system or is triggered by information formed internally in the system and indicates a connection status of the peripheral function modules.

5. Telecommunications switching system for implementing a method of modifying system configuration data sets, comprising:

a plurality of function modules;
   a switching unit as a function module;
   an administration and maintenance unit as a function module connected to the switching unit and into which administration and maintenance jobs are input via administration and maintenance terminal equipment at least one peripheral, task-oriented function module;
   a central system computer in one of the function modules and, decentralized system computers in all other function modules;
   a system administration and maintenance computer program that has program modules for respective dedicated handling of the administration and maintenance jobs;
   a first database allocated to the switching unit and at least one further function-module-associated database allocated to the at least one peripheral, task oriented function module, and
external memories connected respectively to the switching unit, the administration and maintenance unit and the at least one peripheral, task-oriented function module;
the first database and the at least one further function-module-associated database having system configuration data sets, whereof at least one sub-set of corresponding system configuration data sets is stored in more than one database, whereby, triggered by administration and maintenance commands input into the system, the system configuration data sets are modified by the system administration and maintenance computer program, whereby the system administration and maintenance computer program produces database-associated backup copies of at least a part of the databases and the backup copies are deposited in the external memories, that are separate from the respective databases;
wherein the system administration and maintenance computer program controls the system such that, essentially isochronically with the production of database-associated backup copies, the administration and maintenance commands subsequently input into the system that modify database contents are listed in the form of command information in the chronological sequence of their occurrence, wherein every command information is supplemented with database-associated information that indicates implementation or non-implementation of respective administration and maintenance commands; and
wherein, given a connection of a database of a previously disconnected peripheral function module to the system, the administration and maintenance commands corresponding to the listed command information that are supplemented by a non-implementation information are processed in the listed sequence.

6. The telecommunications switching system according to claim 5, wherein at least one part of the function modules have respective first table memories for information that indicates a plurality of produced function-module-associated backup copies; wherein a system computer has a second table memory for information that indicates the plurality of produced function-module-associated backup copies; and wherein the system computer also has a further memory for backup-copy-associated tables.

7. The telecommunication switching system according to claim 5, wherein the system administration and maintenance computer program enters administration and maintenance commands that modify database contents and that are input into the system after the production of database-associated backup copies as well as database-associated information indicating implementation or non-implementation of the respective administration and maintenance command into backup-copy-associated tables.

8. The telecommunications switching system according to claim 5, wherein triggered by the input of an administration and maintenance command that indicates the application of a new peripheral function module to be connected to the system for a first time at a later time and that has a lower-ranking hierarchy level compared to a hierarchy level of a further function module, the system administration and maintenance computer program initiates the production of a copy of the database of the function module ranking hierarchically higher than the new peripheral function module; wherein data sets relevant for the new peripheral function module are extracted from this copy and the relevant data sets are utilized to form a new database, from function-module-associated data; wherein upon initial connection of the new peripheral function module, content of the new database is transferred into the database of the new peripheral function module; and wherein the administration and maintenance commands that are supplemented with non-implementation information and correspond to the listed command information are processed in the listed sequence.

9. The telecommunications switching system according to claim 5, wherein connection and/or disconnection of peripheral function modules is triggered by administration and maintenance commands manually input into the system or is triggered by information formed internally in the system and indicates a connection status of the peripheral function modules.

10. Telecommunications switching system for implementing a method of modifying system configuration data sets, comprising:

a plurality of function modules;
   a switching unit as a function module;
   an administration and maintenance unit as a function module connected to the switching unit and into which administration and maintenance jobs are input via administration and maintenance terminal equipment at least one peripheral, task-oriented function module;
   a central system computer in one of the function modules and, decentralized system computers in all other function modules;
   a system administration and maintenance computer program that has program modules for respective dedicated handling of the administration and maintenance jobs;
   a first database allocated to the switching unit and at least one further function-module-associated database allocated to the at least one peripheral, task oriented function module, and external memories connected respectively to the switching unit, the administration and maintenance unit and the at least one peripheral, task-oriented function module;

the first database and the at least one further function-module-associated database having system configuration data sets, whereof at least one sub-set of corresponding system configuration data sets is stored in more than one database, whereby, triggered by administration and maintenance commands input into the system, the system configuration data sets are modified by the system administration and maintenance computer program, whereby the system administration and maintenance computer program produces database-associated backup copies of at least a part of the databases and the backup copies are deposited in the external memories, that are separate from the respective databases;

at least one part of the function modules having respective first table memories for information that indicates a plurality of produced function-module-associated backup copies;

the system computer of the administration and maintenance unit having a second table memory for information that indicates the plurality of produced function-module-associated backup copies and a further memory for backup-copy-associated tables;

wherein the system administration and maintenance computer program controls the system such that, essentially isochronically with the production of database-associated backup copies, the administration and maintenance commands subsequently input into the system that modify database contents are listed in the form of command information in the chronological sequence of their occurrence, wherein every command information is supplemented with database-associated information that indicates implementation or non-implementation of respective administration and maintenance commands; and wherein, given a connection of a database of a previously disconnected peripheral function module to the system, the administration and maintenance commands corresponding to the listed command information that are supplemented by a non-implementation information are processed in the listed sequence.

* * * * *